US008428463B2

(12) United States Patent
Warren et al.

(10) Patent No.: US 8,428,463 B2
(45) Date of Patent: Apr. 23, 2013

(54) APPARATUS AND METHOD FOR CONTROLLING A DYNAMIC GAIN EQUALIZER

(75) Inventors: Benjamin A. Warren, San Jose, CA (US); Saurabh Kumar, San Mateo, CA (US); Abhijeet D. Deore, Sunnyvale, CA (US); Brian B. Shia, Sunnyvale, CA (US); Ganesh Sundaresan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 292 days.

(21) Appl. No.: 12/777,223

(22) Filed: May 10, 2010

(65) Prior Publication Data
US 2011/0274431 A1 Nov. 10, 2011

(51) Int. Cl.
*H04J 14/02* (2006.01)
(52) U.S. Cl.
USPC .............................. 398/94; 398/81; 398/97
(58) Field of Classification Search ............ 398/94, 398/97, 81
See application file for complete search history.

(56) References Cited

U.S. PATENT DOCUMENTS
2002/0001124 A1* 1/2002 Kinoshita et al. ........ 359/337.1
2002/0154357 A1* 10/2002 Ozveren et al. ........... 359/124

* cited by examiner

*Primary Examiner* — Leslie Pascal

(74) *Attorney, Agent, or Firm* — David L. Soltz

(57) ABSTRACT

Consistent with the present disclosure, a method and apparatus for providing a uniform spectral gain of an optical amplifier is provided. Namely, a "balancing" step is carried out in which an optical channel having the lowest power level input to an optical circuit, such as an dynamic gain equalizer (DGE), is assigned a zero "attenuation error" and is substantially un-attenuated by the DGE. The lowest power level optical signal does not require further attenuation and effectively serves as a reference power level, which the power levels of the remaining optical signals are set to. For example, remaining optical signals are assigned either positive or negative attenuation errors relative to the zero attenuation error based on optical signal input powers to the DGE and accumulated DGE attenuations over time. Those optical signals having a negative attenuation error are substantially unattenuated by the DGE, because such optical signals are adequately attenuated and do not require further attenuation. On the other hand, the DGE is controlled to attenuate those optical signals having positive attenuation errors to thereby flatten the output spectrum of the amplifier. In one example, interpolation techniques may be employed to control those portions of the DGE (e.g., attenuators or pixels) that do not receive a channel, such that adjacent pixels that receive channels may impart a desired amount of attenuation. In addition, further interpolation may be provided to appropriately control the DGE pixels, if the number of channels supplied to the DGE is different than the number of pixels of the DGE.

22 Claims, 8 Drawing Sheets

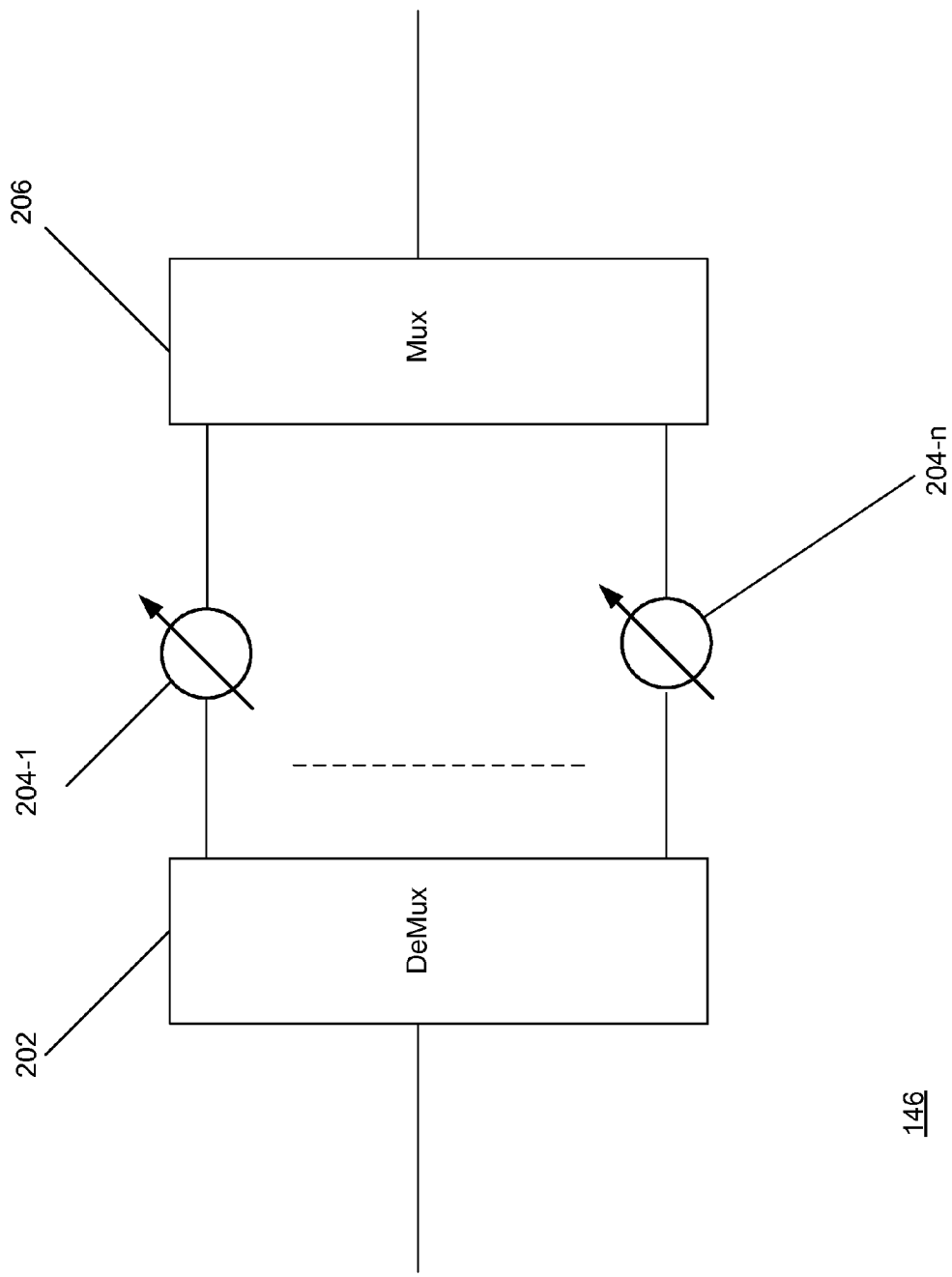

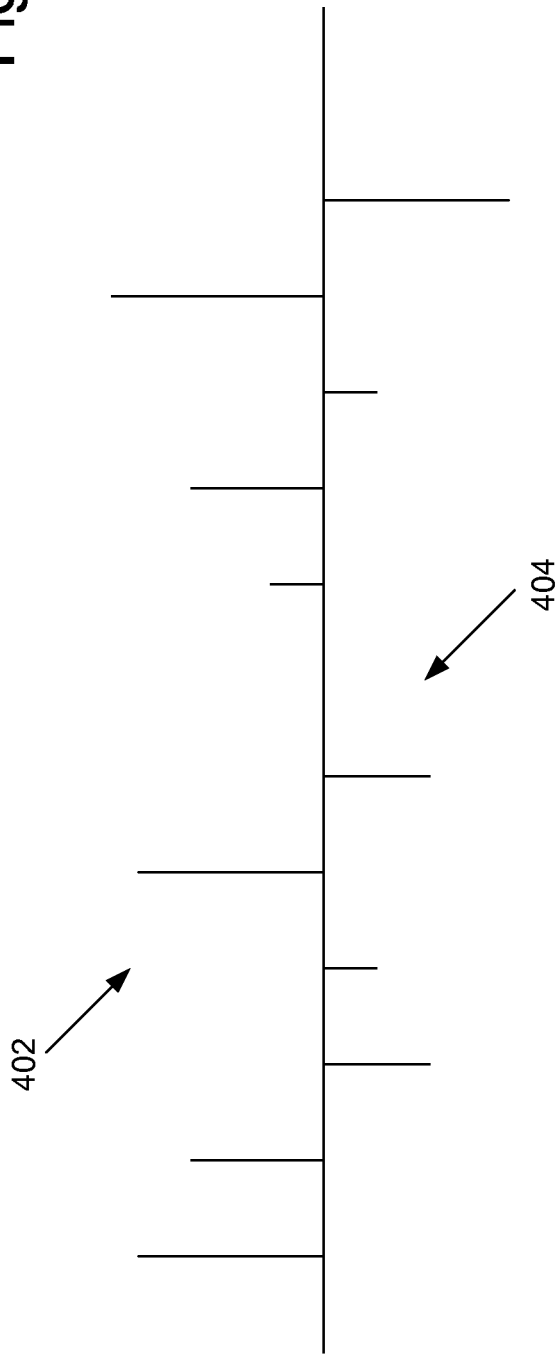

APPARATUS AND METHOD FOR CONTROLLING A DYNAMIC GAIN EQUALIZER

BACKGROUND

Wavelength division multiplexing (WDM) systems are known in which plural optical signals or channels are transmitted over an optical fiber, with each channel being assigned a particular wavelength. Such systems typically include a plurality of receivers, each detecting a respective channel by filtering, for example, the remaining channels.

Optical channels in a WDM system or WDM channels are frequently transmitted over silica based optical fibers, which typically have relatively low loss at wavelengths within a range of 1525 nm to 1580 nm. WDM channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers typically do not uniformly amplify light within the spectral region of 1525 to 1580 nm. For example, an optical channel at a wavelength of 1540 nm, for example, is typically amplified 4 dB more than an optical channel at a wavelength of 1555 nm. While such a large variation in gain can be tolerated for a system with only one optical amplifier, it cannot be tolerated in a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical amplifiers providing substantially uniform spectral gain have been developed. In particular, optical amplifiers including a dynamic gain equalizer (DGE) are known, which can flatten an output spectrum of an optical amplifier. Various techniques are also known for controlling to DGE, such that the output power spectrum of an optical amplifier is substantially uniform. There is a need, however, for a method and apparatus that can control a DGE to rapidly converge to a spectrally uniform amplifier output.

In addition, conventional DGEs may be characterized as having a plurality "pixels", each of which having an associated attenuation to adjust the optical power of a given channel. Typically, due to limitations of the DGE, the attenuation associated with one pixel may not exceed the attenuation of an adjacent pixel by a predetermined amount. Accordingly, there is also a need for a method and apparatus that controls those pixels that do not receive a channel, such that adjacent pixels that receive channels may impart a desired amount of attenuation.

Further, in many WDM systems, the spectral spacing between channels has been reduced in order to provide additional channels and realize systems with higher capacity. In such systems, the channel spacing may be 25 GHz, and a total of 160 channels may be transmitted. On the other hand, commercially available DGEs may have a different number of pixels, such as 128. Thus, there may not be a one-to-one correspondence between channels and pixels, such that operation of one pixel may interfere with the transmission of multiple channels. Accordingly, it is also desirable to appropriately control of the DGE pixels when the number of channels supplied to the DGE is different than the number of pixels of the DGE.

SUMMARY

Consistent with an aspect of the present disclosure, a method is provided that comprises supplying a plurality of optical signals to an optical circuit, each of the plurality of optical signals having a corresponding one of a plurality of wavelengths. The method also includes identifying a plurality of power levels at an input to the optical circuit, a lowest power level being one of the plurality of power levels that is less than remaining ones of the plurality of power levels, and determining a plurality of target attenuations, each of which corresponding to a difference between a corresponding one of the plurality of power levels and the lowest power level. Each of the plurality of target attenuations corresponds to a respective one of the plurality of optical signals. In addition, the method includes determining a plurality of attenuation errors, each of which corresponding to a difference between a corresponding one of the plurality of target attenuations and a respective one of a plurality of cumulative attenuations. Each of the plurality of cumulative attenuations corresponding to an amount a corresponding one of the plurality of optical signals has been attenuated over a period of time. Each of the plurality of attenuation errors also corresponds to a respective one of the plurality of optical signals. The method further includes attenuating selected ones of the plurality of optical signals, such that the plurality of power levels are substantially equal after said attenuating. The selected ones of the plurality of optical signals being associated with a sub-group of the plurality of attenuation errors. Each attenuation error in the sub-group of the plurality of attenuation errors having a value greater than 0 dB.

Consistent with an additional aspect of the present disclosure, an apparatus is provided that comprises an optical circuit configured to receive a plurality of optical signals and output the plurality of optical signals. Each of the plurality of optical signals has a corresponding one of a plurality of wavelengths. An optical power monitoring circuit is also provided that is configured to generate a plurality of sense signals, each of which being indicative of a corresponding one of a plurality of power levels. Each of the plurality of power levels being associated with a corresponding one of the plurality of optical signals. In addition, a processor circuit is provided that identifies the plurality of power levels, wherein a lowest power level is one of the plurality of power levels that is less than remaining ones of the plurality of power levels. The processor circuit also determines a plurality of target attenuations, each of which corresponding to a difference between a corresponding one of the plurality of power levels and the lowest power level. Each of the plurality of target attenuations corresponds to a respective one of the plurality of optical signals. The processor circuit further determines a plurality of attenuation errors, each of which corresponding to a difference between a corresponding one of the plurality of target attenuations and a respective one of a plurality of cumulative attenuations. Each of the plurality of cumulative attenuations corresponds to an amount a corresponding one of the plurality of optical signals has been attenuated over a period of time. Each of the plurality of attenuation errors corresponds to a respective one of the plurality of optical signals. Also, the processor circuit outputs a plurality of control signals. The optical circuit attenuates selected ones of the plurality of optical signals in response to the control signals, such that each of the plurality of power levels is substantially equal to one another after such attenuating. The selected ones of the plurality of optical signals are associated with a sub-group of the plurality of attenuation errors. Each attenuation error in the sub-group of the plurality of attenuation errors has a value greater than 0 dB.

As used herein, the terms optical signals, channels, and optical channels may be used interchangeably.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure.

BRIEF DESCRIPTION OF THE DRAWINGS

FIG. 2 illustrates an example of a dynamic gain equalizer (DGE) consistent with a further aspect of the present disclosure;

FIGS. 4a and 4b illustrate plots of exemplary attenuation errors consistent with an aspect of the present disclosure;

DESCRIPTION OF THE EMBODIMENTS

Consistent with the present disclosure, a method and apparatus for providing a uniform spectral gain of an optical amplifier is provided. Namely, a "balancing" step may be initially carried out in which an optical channel having the lowest power level input to an optical circuit, such as an dynamic gain equalizer (DGE), is assigned a zero "attenuation error" and is substantially un-attenuated by the DGE. The lowest power level optical signal does not require further attenuation and effectively serves as a reference power level, which the power levels of the remaining optical signals are set to. For example, remaining optical signals are assigned either positive or negative attenuation errors relative to the zero attenuation error based on optical signal input powers to the DGE and accumulated DGE attenuations over time. The DGE may then be controlled to adjust the power of those optical signals having positive attenuation errors to thereby flatten the output spectrum of the amplifier. On the other hand, optical signals having a negative attenuation error are substantially un-attenuated by the DGE, because such optical signals are adequately attenuated and do not require further attenuation. Thus, the energy, and thus the loss, that would otherwise be applied to the negative-attenuation-error signals may be applied to other pixels to thereby adequately attenuate optical signal having relatively high power. Alternatively, such loss may be "backed-off" in order that the DGE does not have an unnecessarily high loss which could limit amplification by the amplifier.

Further, in one example, interpolation techniques may be employed to control those portions of the DGE (e.g., attenuators or pixels) that do not receive a channel, such that adjacent pixels that receive channels may impart a desired amount of attenuation. In addition, further interpolation may be provided to appropriately control the DGE pixels, if the number of channels supplied to the DGE is different than the number of pixels of the DGE.

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1A:
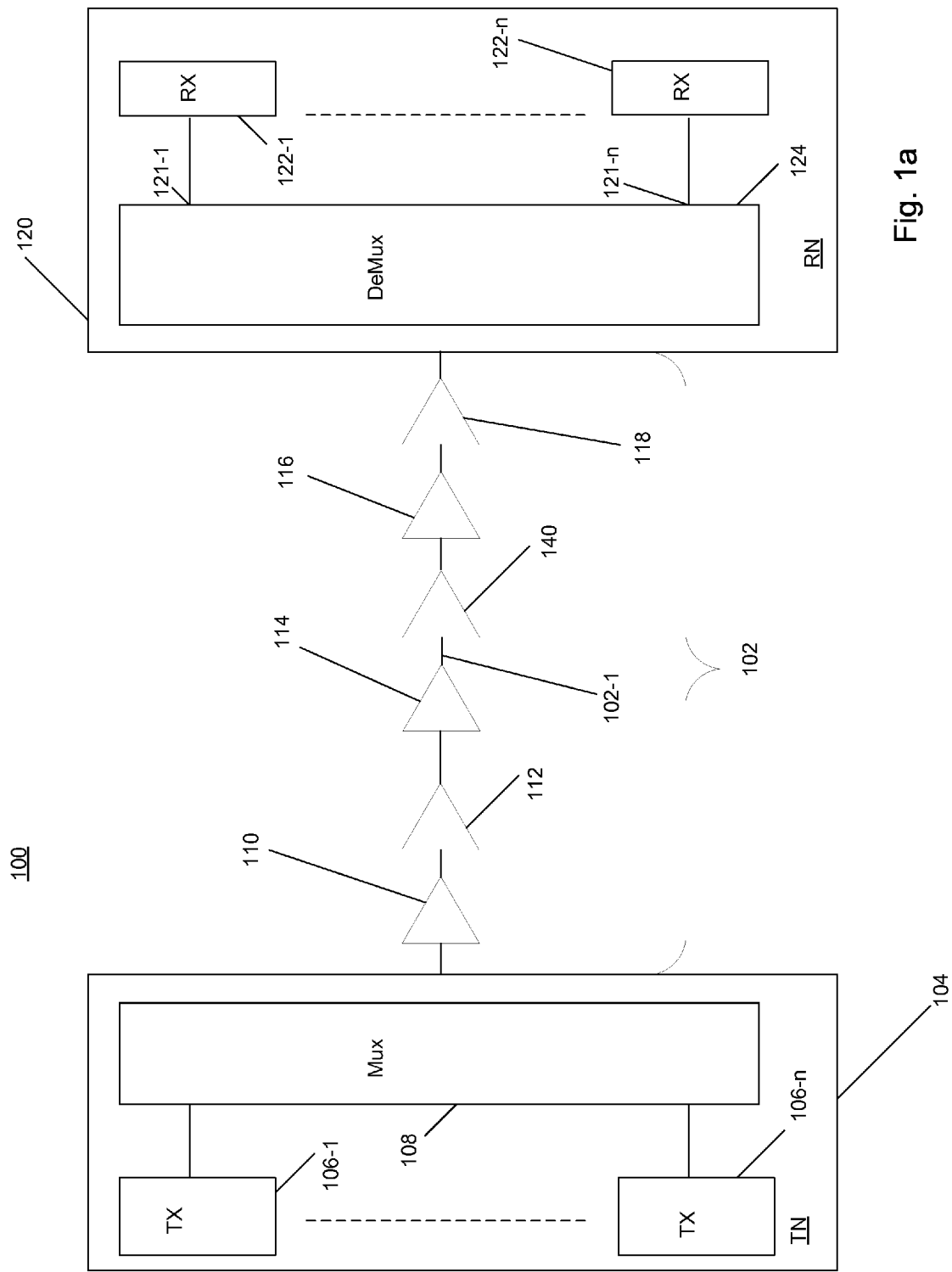
FIG. 1a illustrates an example of a wavelength division multiplexed optical communication system consistent with an aspect of the present disclosure.

FIG. 1 illustrates an example of a wavelength division multiplexed (WDM) optical communication system 100 consistent with the present disclosure. WDM system 100 includes a transmit node (TN) 104 having a plurality of transmitter blocks TX 106-1 to 106-n, each of which feeding an optical signal, for example, to combiner or optical multiplexing circuitry (Mux) 108. Each optical signal has a corresponding one of a plurality of wavelengths. The optical signals are fed or combined onto an optical path 102, which may include optical amplifiers 110, 112, 114, 140, 116, and 118 to amplify the optical signals at locations along path 102. The optical signals may propagate along optical path 102 to a receive node (RN) 120, which may include known optical demultiplexing circuitry (DeMux) 124. Optical demultiplexing circuitry 124 may have a plurality of outputs 121-1 to 121-n, each of which supplying a corresponding one of the plurality of optical signals to a respective one of receiver blocks (RX) 122-1 to 122-n. Each receiver block RX 122-1 to 122-n may include a photodiode to convert the received optical signals into corresponding electrical signals. Additional known circuitry may be provided to process such electrical signal.

Each of optical amplifiers 110, 112, 114, 116, and 118 may include erbium doped fiber amplifier (EDFA) stages and may provide a certain degree of gain flatness or uniform gain. However, after propagating over excessively long distances, for example, such flatness may be inadequate. As a result, the optical signals propagating along optical path 102 may be amplified unevenly. Accordingly, as discussed in greater detail below with reference to FIG. 1b, additional components may be provided in optical amplifier 140 in order to further equalize the power of the optical signals. It is understood, however, that such components may also be provided in one or more of optical amplifiers 110, 112, 114, 116, and 118. Moreover, it is understood that any appropriate number of optical amplifiers may be provided along optical path 102, and the present disclosure is not limited to the number and types of optical amplifiers shown in FIG. 1a. For example, in addition to or instead of the above-noted optical amplifiers, one or more Raman optical amplifiers may be provided along optical path 102.

Figure 1B:
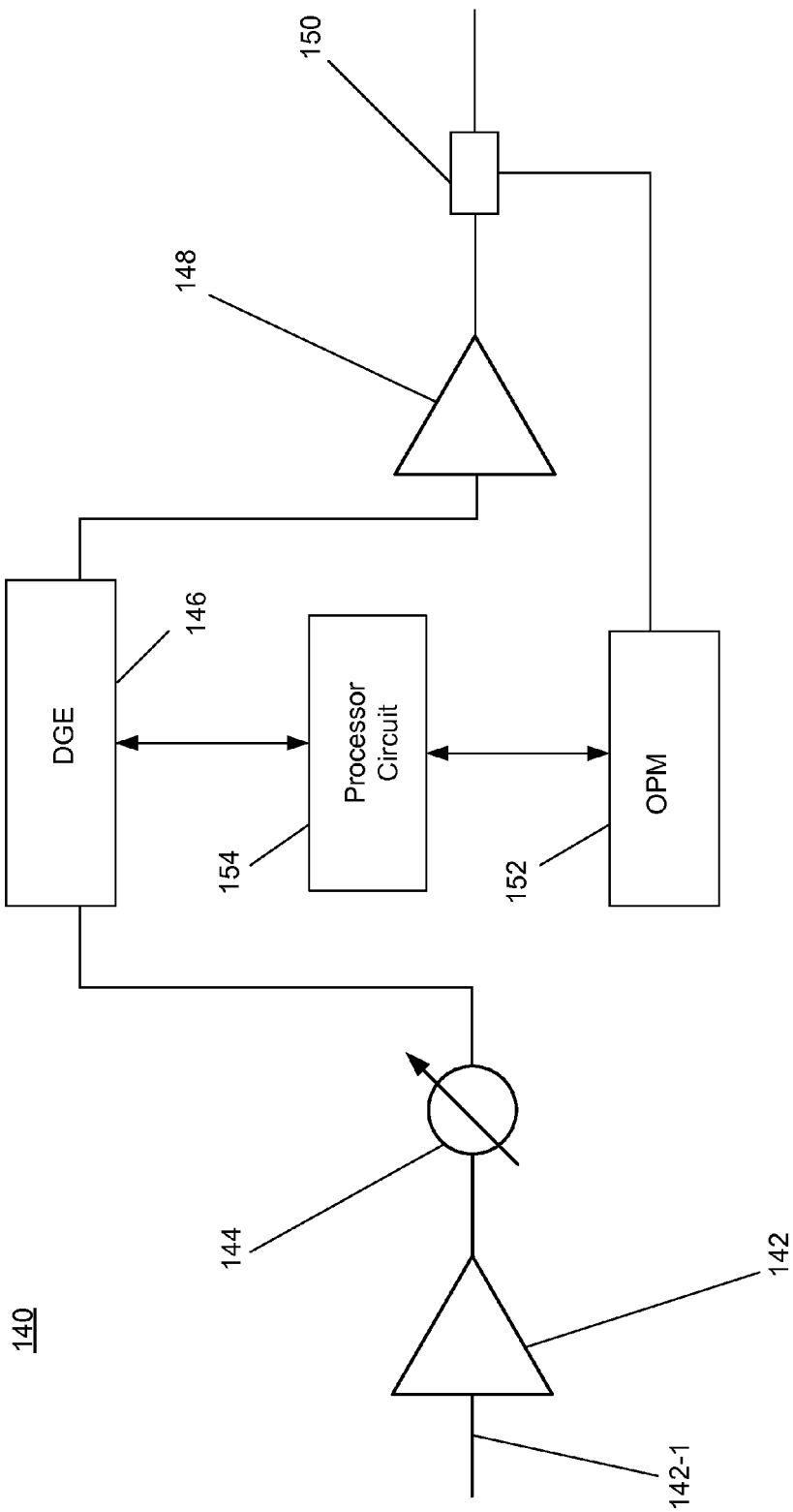
FIG. 1b illustrates an example of an optical amplifier consistent with an additional aspect of the present disclosure.

A detailed block diagram of optical amplifier 140 is shown in FIG. 1b. Optical amplifier 140 includes a first amplification stage 142 and an input 142-1, which may receive the optical signals propagating along optical path 102. First amplification stage 142 may include an erbium doped fiber that may be supplied with pump light in a known manner by a pump laser, to thereby impart a first gain to the optical signals. The amplified optical signals are then fed to a variable optical attenuator 144, which may be employed to adjust the power of each channel by a fixed amount and supply the optical signals to dynamic gain equalizer 146. Variable optical attenuator 144 may be provided to control an amount of gain imparted by first amplification stage 142. DGE 146 further attenuates the received optical signals and directs such optical signals to a second optical amplification stage 148. Second optical amplification stage 148 may also include a segment of erbium-doped fiber, which may also be supplied with pump light in a known manner by an additional pump laser, to thereby impart a second gain to the optical signals. An optical tap 150, including a known optical coupler, for example, may be provided to supply a portion of each optical signal to a known optical power monitor (OPM) 152, which supplies corresponding electrical signals indicative of the optical power of the optical signals output from amplifier stage 148 to a processor circuit 154. As discussed in greater detail below, processor circuit 154 may include a microprocessor or computer that supplies control signals to DGE 146 to selectively attenuate each optical signal so that the optical signals output from second amplification stage 148 have substantially uniform power levels.

FIG. 2 illustrates a block diagram of DGE 146 in greater detail. DGE 146 may include a demultiplexer 202, which supplies at least a portion of each optical signal to a corresponding one of variable optical attenuators 204-1 to 204-n. In response to the control signals supplied by processor circuit 154, variable optical attenuators 204-1 to 204-n supply an amount of attenuation to each of the optical signals and supply the optical signals to multiplexer (Mux) 206. Mux 206, in turn, combines and outputs the optical signals to second amplification stage 148, as noted above in connection with FIG. 1b. Demultiplexer 202 may include a conventional optical de-interleaver, and multiplexer 206 may include a conventional optical interleaver.

A detailed discussion of the operation of DGE 146, OPM 152 and processor circuit 154 will next be presented with reference to FIGS. 3a, 3b, 4 and 5.

Figure 3A:
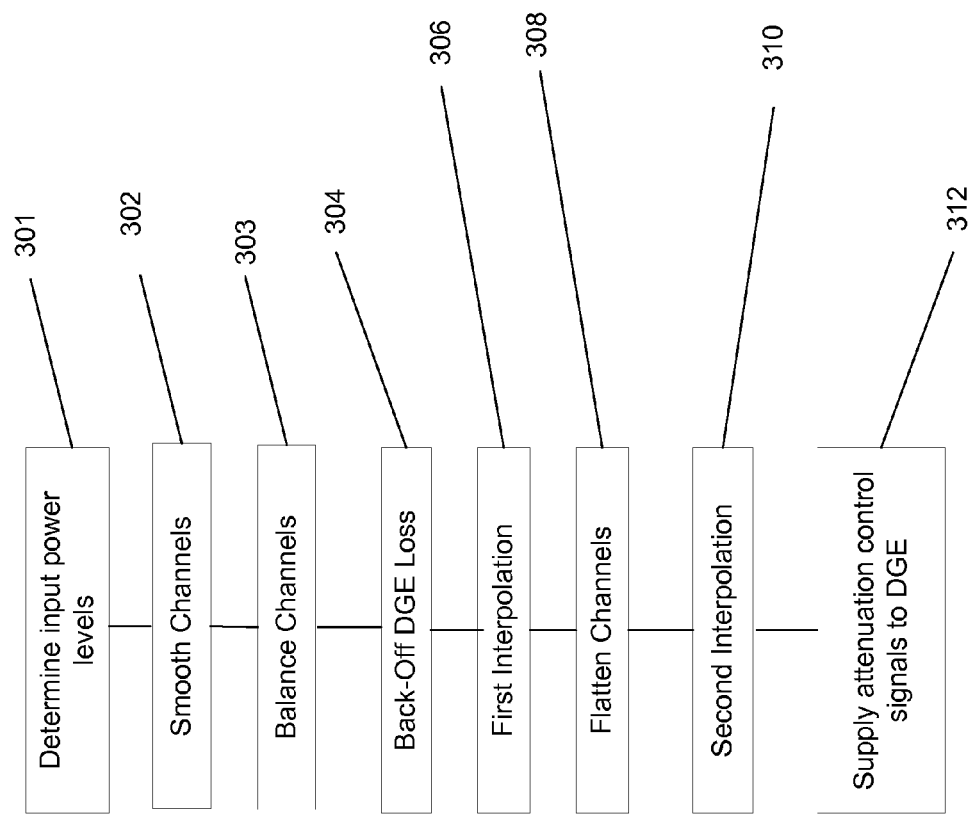
FIG. 3a illustrates a flowchart in connection with an aspect of the present disclosure.

FIG. 3a illustrates a flowchart 300, which identifies various processes or steps which may be carried by processor circuit 154 in conjunction with OPM 152 and DGE 146 consistent with an aspect of the present disclosure. In one of such processes or steps, 301, the input power of each optical signal or channel is determined. Next, in step 302, the input power levels are "smoothed" or averaged in accordance with a known averaging or smoothing algorithm. In one example, a given power level may be recalculated based on weighted average of other power levels about and including the given power level (such as the weighted power levels with the given power level and the power levels associated with three pixels on either side of the pixel associated with the given power level). An adjacent power level may then be recalculated in a similar fashion until each power level has been recalculated.

Then, in step or processor 303, the channels are "balanced", such that the channel (or channels) having the lowest power level of the smoothed power levels is unattenuated by DGE 146 In addition, other low power channels or channels subject to an existing loss or attenuation that is relatively high may also pass through DGE 146 substantially un-attenuated.

In step 304, a determination is made, by processor circuit 154, for example, as to whether the attenuation or loss imparted by DGE 146 may be "backed-off" and how much that "backed-off" loss may be. That is, a difference is determined between a span loss associated with a portion of optical path 102 (or fiber span 102-1 (see FIG. 1a) coupled to an input 142-1 (see FIG. 1b) of amplifier 140) and a maximum span loss. For span losses above the maximum span loss, optical amplifier 140 may not be able to output the received optical signals with sufficient power. Thus, the maximum span loss is that span loss below which optical signals carried by the fiber span may be sufficiently amplified. A "cushion" or margin may be subtracted from the difference, and the remaining "loss" may be allocated to the DGE. Accordingly, if the span loss decreases, more loss may be allocated to the DGE and the DGE may be able to substantially attenuate high power optical signals. If the span loss increases, however, such that the difference between the maximum span loss and the actual span loss is less than a predetermined value, less loss may be allocated to the DGE, such that loss is "backed-off" the DGE. Next, in step 306, processor circuit 154 may perform a first interpolation in which attenuation values are determined for those pixels or variable optical attenuators 204-1 to 204-n of DGE 146 which do not receive an optical signals (non-active channel VOAs). That is, such attenuation values are interpolated between attenuation values associated with variable optical attenuators adjacent such non-active VOAs. The interpolation performed in step 306 may take into account limitations of the DGE that do not permit a rapid change in attenuation from one pixel or variable optical attenuator (204-1 to 204-n) to the next. Otherwise, large attenuation differences between the non-active channel VOAs and those variable optical attenuators that receive optical signal, may interfere with proper operation of DGE 146. Accordingly, appropriate attenuation values are determined for non-active channel VOAs. In one example, the optical signals may be spectrally arranged in bands, with spectral gaps lacking optical signals between each band. The interpolation performed in step 306 may determine appropriate attenuation values for those non-active VOAs associated with wavelengths in the spectral gaps. In addition, such interpolation may determine appropriate attenuation values for those non-active VOAs associated with wavelengths of non-populated channels in system 100. Conventional linear interpolation techniques may be employed.

Next, in step 308, those channels that are not un-attenuated in step 303, are subject to flattening in step 308. Such flattening may introduce loss, and, therefore, "back-off" step 306 is preferably performed before step 308.

Figure 6:
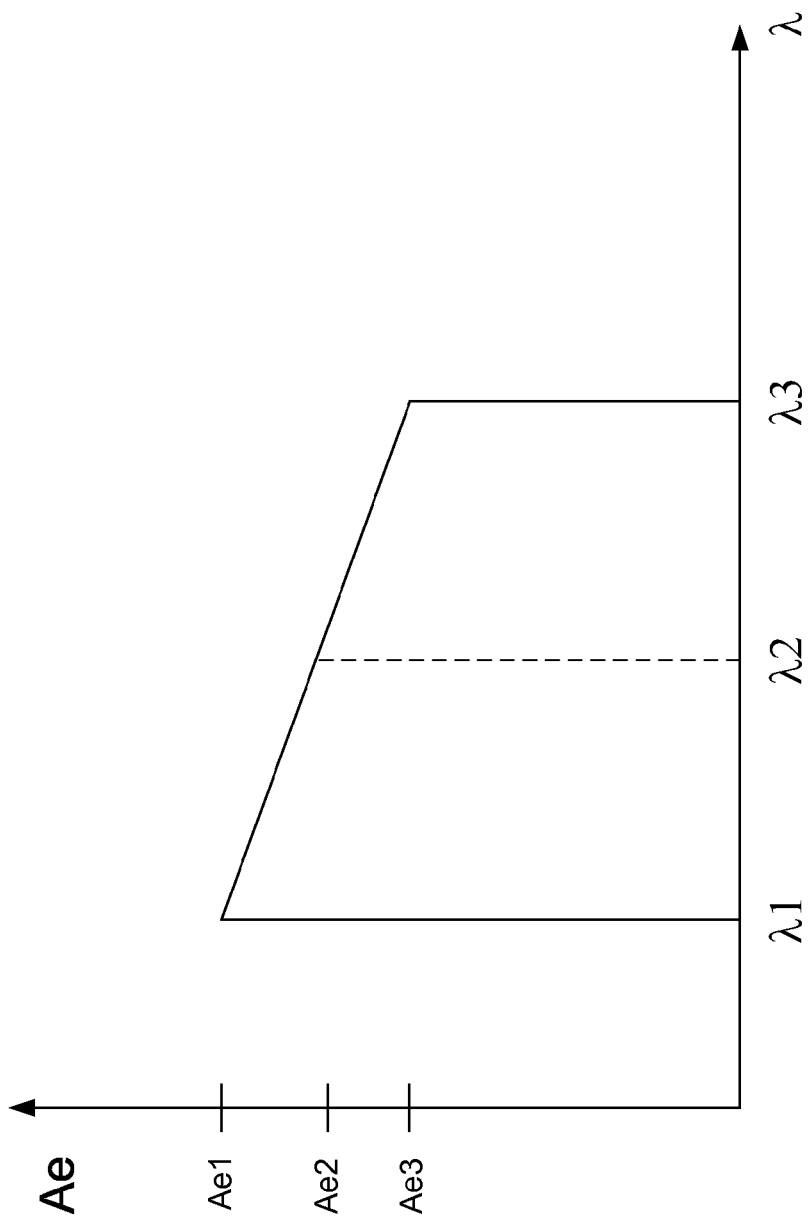
FIG. 6 illustrates an interpolated plot of attenuation error values.

In the example shown in FIG. 6, channels having wavelengths $\lambda 1$ and $\lambda 3$ are transmitted through DGE 146. The channel at wavelength $\lambda 2$ is absent, such that there is no channel at this wavelength. Channels at wavelengths $\lambda 1$ and $\lambda 3$ have attenuation errors Ae1 and Ae3, respectively. Attenuation Ae2 may be determined by through an interpolation between attenuation errors Ae1 and Ae3 in a known manner. For example, attenuation Ae2 may be calculated by linear interpolation.

In step 310, a second interpolation is performed to account for a difference in the number of attenuators 204-1 to 204-n in DGE 146 and the number of optical signals. In one example, the capacity of the system 100 in FIG. 1a may be 160 channels or optical signals, each of which having a corresponding one of a plurality of wavelengths. The number of variable optical attenuators 204-1 to 204-n, however, may be 128. Thus, each of variable optical attenuators 204-1 to 204-n may receive portions of more than one optical signal. Accordingly the second interpolation performed in step 310 further adjusts the attenuation for each variable optical attenuator 204-1 to 204-n, such that each optical signal is attenuated by a desired amount. Corresponding control signals are next supplied to DGE 146 to control variable optical attenuators 204-1 to 204-n accordingly.

Figure 3B:
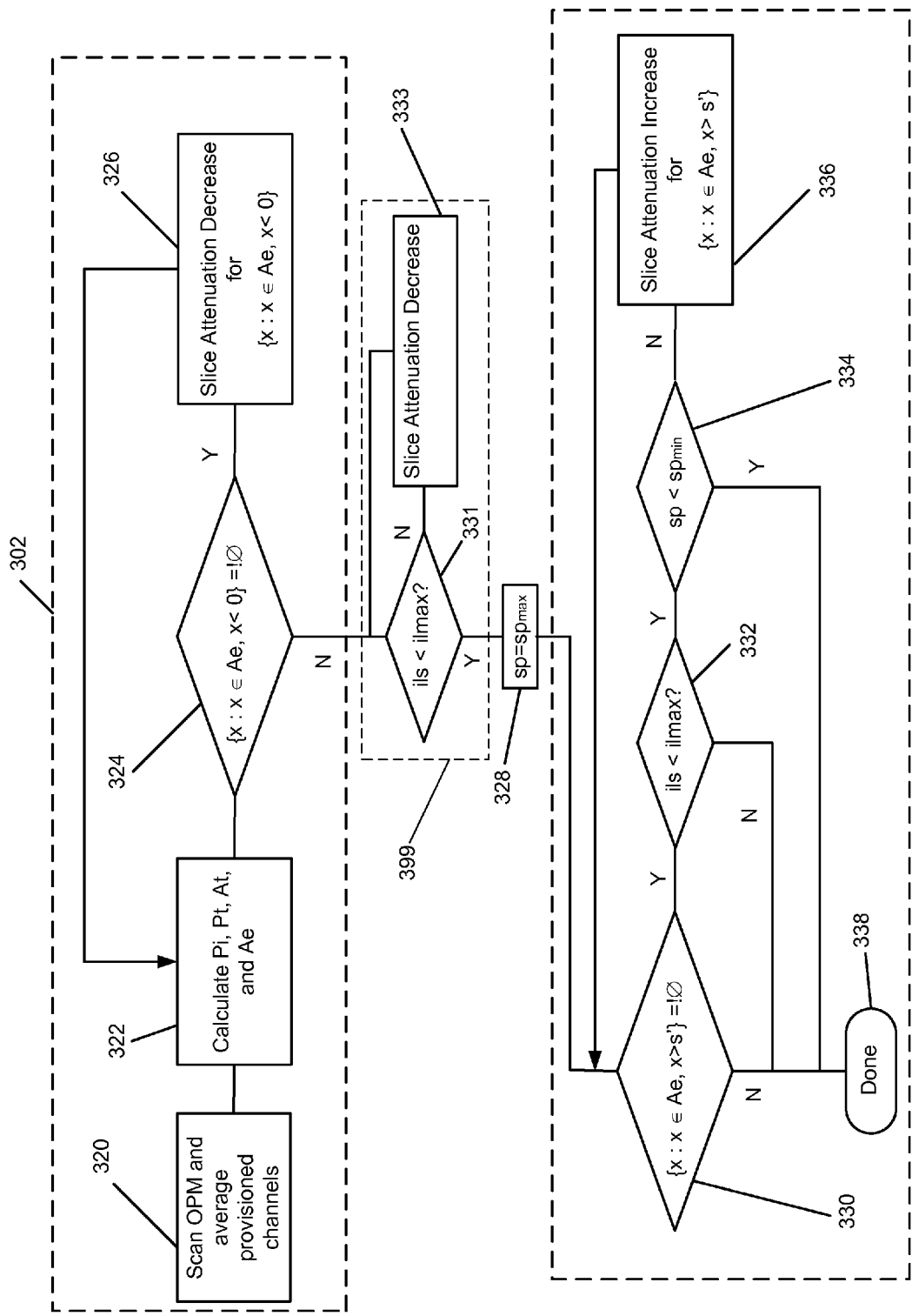
FIG. 3b illustrates a detailed flowchart in connection with selected processes identified in the flow chart of FIG. 3.

Flowchart 390 in FIG. 3b illustrates processes 302 and 304 in greater detail. For convenience, processes 302 and 304 will be referred to as "control loops" 302 and 304, respectively, in connection with the description of FIG. 3b.

In step 320 of control loop 302, processor circuit 154 scans or reads from OPM 152 the power levels of each optical signal present or provisioned at the output of second amplification stage 148. As noted above, these power levels may be smoothed or averaged in a known manner. For example, a given power level may be recalculated based on weighted average of other power levels about the given power level. An adjacent power level may then be recalculated in a similar fashion until each power level has been recalculated.

In step 322, parameters Pi (input power level of each channel to the DGE), Pt (target power for each channel), At (target attenuation for each channel), and Ae (attenuation error for each channel) are calculated. Input power, Pi, for each channel may be the sum of the output power of the channel, as measured by OPM 152 and an accumulated attenuation Ac of the channel of over a period of time up until the current instant. The accumulated attenuation preferably accurately reflects the amount attenuation imparted by a corresponding attenuator over such time period. The target attenuation, At, for each channel may be the difference of input power Pi and a target power Pt (Pi−Pt) for each channel. The target power, Pt, may be equal to the minimum or the lowest input power Pi. Further, the attenuation error, Ae, for each channel may be the difference between the target attenuation, At, and the accumulated attenuation, Ac, or Ae=At−Ac. Target attenuations may also be interpolated for non-active channel VOAs associated with unpopulated and unused wavelengths.

A decision is next made in step 324 as to whether there are any accumulated errors Ae (x being in the set of Ae's) having a negative value, i.e., less than 0 dB. If "yes", step 326 is performed. Otherwise, the process continues to step 328.

In step 326, each negative Ae is reduced in magnitude to equal the magnitude of a slice or step size (a "slice attenuation decrease"). Accordingly, if, for example, an Ae associated with a particular channel has a value of −6 dB, and the step size is 2 dB. That Ae will be assigned a new value of −4 dB. Control loop 302 next returns to step 322 and Pi, Pt, At, and Ae are recalculated. Each negative Ae is identified in step 324, and the magnitude of such negative Ae's is reduced to be that of a smaller step size, e.g., 1 dB. Successive iterations of control loop 302 will further reduce the magnitude of each negative Ae. As a result, those channels having negative Ae's will have a relatively small magnitude, which may be substantially equal to zero.

FIG. 4a graphically illustrates Ae's 402 (a first sub-group of Ae's having a value greater than 0 dB) having a positive value and Ae's 404 having a zero or negative value (a second sub-group of Ae's having a value of 0 dB or less). As noted above, after several iterations of control loop 302, the magnitude of Ae's 404 is reduced, thereby resulting in the graphical illustration in FIG. 4b in which Ae's 404 are set to be substantially equal to zero. Thus, since channels having a negative Ae need not be attenuated, the loss associated with each may be allocated to higher power channels or may be "backed-off," as noted above, so that the amplifier may operate properly.

Returning to FIG. 3b, a determination is made as to whether the insertion loss (ils) of DGE 146 is less than a maximum insertion loss (ilmax) (step 331), and, if so, a spread (sp) associated with the Ae maximum and minimum Ae is set to a predetermined value, such as a maximum spread spm (step 328). If not, the loss or attenuation associated with DGE 146 is reduced by a fixed increment or slice, and the amount of such loss reduction corresponds to an amount of "back-off". Such "backing-off" is done in a loop 399 until the condition ils<ils max is achieved, and with each iteration of loop 399, ils is reduced by the fixed increment.

After step 328 is carried out, control loop 304 is entered and, in step 330, a determination is made with respect to each Ae (or each x in the set of Ae) as to whether a particular Ae is greater than a given step size or slice s'. If "no", and there are no other Ae's greater than s', control loop 304 is exited (step 338). On the other hand, if any Ae is greater than step size s', then a determination is made as to whether the insertion loss (ils) of DGE 146 is less than a maximum insertion loss (step 332). If "no", control loop 304 is exited. Otherwise, a determination is made as to whether the spread power sp (i.e., the difference between minimum and maximum output power from amplifier 140 is less than a minimum spread value, sp min (step 334). If yes, control loop 304 is exited. Otherwise, for each attenuation error, Ae, greater than s', such Ae is increased in magnitude by s'. Control loop 304 next returns to step 330, and determinations 332 and 334 may be repeated, unless control loop 304 is exited. If not, step 336 is repeated and control loop 304 returns to step 330 for another iteration.

Successive iterations of control loop 304 may be repeated for a given step size s'. Step size s' may then be reduced and further iterations of control loop 304 may be performed. Optionally, iterations with step size s' may be repeated again or for any desired number of times.

As a result, the output power thus has a minimum spread and may then be subject to the first interpolation (step 308 of FIG. 3a) to calculate further attenuation error values for non-active channel VOAs. That is, interpolated Ae's are determined, based on the active channel Ae's, and each of the interpolated Ae's are associated with a corresponding non-active channel wavelength, as noted above.

Further interpolation may be performed if the number of optical signals of a fully populated system (100) is different than the number of variable optical attenuators 204-1 to 204-n (step 310 of FIG. 3a). For example, with a relatively narrow channel spacing of 25 GHz, 160 channels may be provided, while DGE 146 may include 128 attenuators or pixels. Thus, the resulting attenuation values or attenuations are then used by processor circuit 154 to generate control signals that are supplied to the variable optical attenuators 204-1 to 204-n so that each variable optical attenuator supplies a desired attenuation to achieve flattening. That is, the second interpolation, and therefore, the control signals, are generated based on the Ae's and interpolated Ae's, the number of variable optical attenuators 204-1 and 204-n, and the number of optical signals or number of optical wavelengths (the sum of wavelengths of populated and non-active channels). Those channels being associated with Ae's that have values less than or equal to zero are typically un-attenuated by DGE 146.

Consistent with the present disclosure, after the control signals are applied to DGE 146, control loops 302 and 304 may be repeated, but with different step sizes or slices s and s', as noted above. The first and second interpolations may also be repeated in connection with each exit from control loops 302 and 304.

Figure 5:
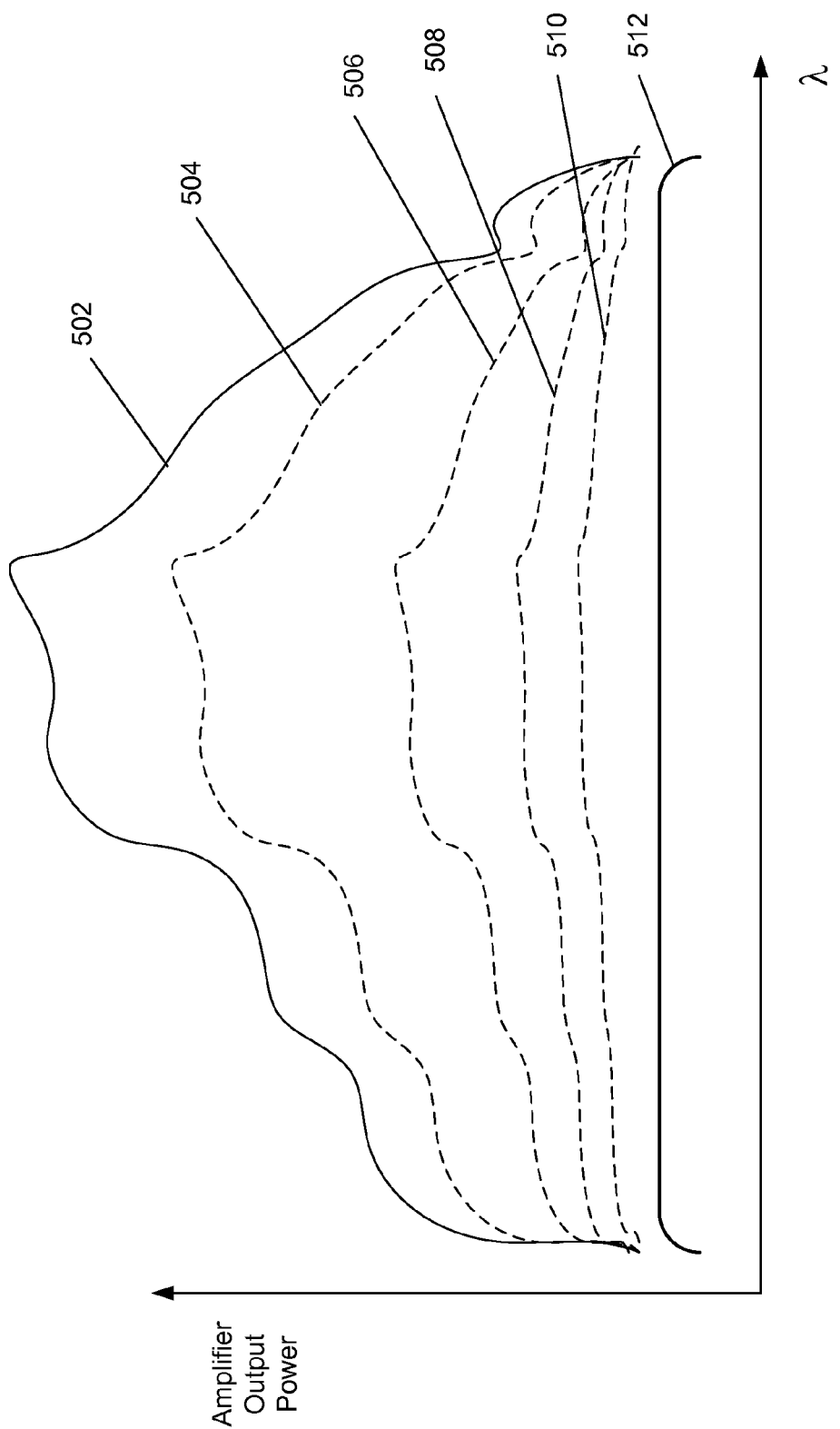
FIG. 5 illustrates a plot of output amplifier power as a function of wavelength over a series power adjusting iterations consistent with an aspect of the present disclosure.

FIG. 5 illustrates plots of output power of amplifier 140 as a function of wavelength over a series power adjusting iterations consistent with an aspect of the present disclosure. In particular, plot 502 corresponds to the output power of amplifier 140 without flattening. Plots 504, 506, 508, and 510 represent the output amplifier power after successive iterations of balancing (step 302), flattening (step 304), and first and second interpolations. In step 512, a substantially plot 512 is obtained.

Thus, consistent with the present disclosure, loss associated with the DGE may be dynamically allocated to optimize amplifier performance, through "back-off", as noted above. Moreover, interpolation techniques may be employed to accommodate differences in the number of channels and the number of pixels or variable optical attenuators in the DGE. Further, additional interpolation techniques may be employed to determine appropriate attenuations of those pixels or variable optical attenuators that do not receive an optical signal, in light of the maximum difference in attenuation from one variable optical attenuator to the next.

Other embodiments will be apparent to those skilled in the art from consideration of the specification. It is intended that the specification and examples be considered as exemplary only, with a true scope and spirit of the invention being indicated by the following claims.

What is claimed is:

1. A method comprising:
supplying a plurality of optical signals to an optical circuit, each of the plurality of optical signals having a corresponding one of a plurality of wavelengths;
identifying a plurality of power levels at an input to the optical circuit;
smoothing the power levels, a lowest power level being one of the plurality of the smoothed power levels that is less than remaining ones of the plurality of power levels;
determining a plurality of target attenuations, each of which corresponding to a difference between a corresponding one of the plurality of power levels and the lowest power level, each of the plurality of target attenuations corresponding to a respective one of the plurality of optical signals;
determining a plurality of attenuation errors, each of which corresponding to a difference between a corresponding one of the plurality of target attenuations and a respective one of a plurality of cumulative attenuations, each of the plurality of cumulative attenuations corresponding to an amount a corresponding one of the plurality of optical signals has been attenuated over a period of time, each of the plurality of attenuation errors corresponding to a respective one of the plurality of optical signals;
attenuating selected ones of the plurality of optical signals, such that the plurality of power levels are substantially equal after said attenuating, the selected ones of the plurality of optical signals being associated with a sub-group of the plurality of attenuation errors, each attenuation error in the sub-group of the plurality of attenuation errors having a value greater than 0 dB.

2. A method in accordance with claim 1, wherein the sub-group of the plurality of attenuation errors is a first sub-group of the plurality of attenuation errors, each of remaining ones of the plurality of optical signals, other than the selected ones of the plurality of optical signals, corresponding to a respective one of a second sub-group of the plurality of attenuation errors, each attenuation error in the second sub-group of the plurality of attenuation errors having a value equal to or less than 0 dB, each of the remaining ones of the plurality of optical signals being substantially unattenuated by the optical circuit.

3. A method in accordance with claim 1, wherein said supplying includes outputting the plurality of optical signals from a stage of an optical amplifier to the optical circuit.

4. A method in accordance with claim 3, wherein the stage is a first stage of the optical amplifier, the method further including:
supplying the optical signals from the optical circuit to a second stage of the optical amplifier.

5. A method in accordance with claim 1, wherein the optical circuit includes a dynamic gain equalizer (DGE) circuit.

6. A method in accordance with claim 5, wherein the DGE includes a plurality of optical attenuators.

7. A method in accordance with claim 1, wherein said attenuating said selected ones of the plurality of optical signals includes successively attenuating said selected ones of the plurality of optical signals over a plurality of iterations.

8. A method in accordance with claim 7, wherein an amount of attenuation associated with a first one of the plurality of iterations is different than an amount of attenuation associated with a second one of the plurality of iterations.

9. A method in accordance with claim 1, wherein the plurality of attenuation errors is a first plurality of attenuation errors, and the plurality of wavelengths being a first plurality of wavelengths, a second plurality of wavelengths being associated with an absence of the plurality of optical signals, the method further comprising:
determining a second plurality of attenuation errors, each of which corresponding to a respective one of the second plurality of wavelengths, said adjusting being based, at least in part, on the first and second pluralities of attenuation errors.

10. A method in accordance with claim 9, wherein the optical circuit includes a plurality of variable optical attenuators, a number of the plurality of optical attenuators being different than a sum of the pluralities of first and second wavelengths, said adjusting including:
generating control signals based on the first and second pluralities of attenuation errors, the number of the plurality of variable optical attenuators, and the sum of the pluralities of first and second wavelengths; and
supplying each of the control signals to a corresponding one of the plurality of variable optical attenuators, such that each of the plurality of variable optical attenuators has a corresponding one of a plurality of attenuations, the plurality of optical signals being attenuated in accordance with the plurality of attenuations.

11. A method in accordance with claim 1, wherein each of the plurality of optical signals is supplied to the optical circuit from a fiber span, the fiber span having an associated span loss, the optical circuit being provided in an optical amplifier that is configured to amplify optical signals, provided that the span loss is between a maximum and minimum span loss, the method further including the steps of:
subtracting the span loss from the maximum span loss to obtain a loss amount; and
allocating loss associated with the optical circuit to the loss amount, when the loss amount is less than a predetermined value.

12. An apparatus comprising:
an optical circuit configured to receive a plurality of optical signals and output the plurality of optical signals, each of the plurality of optical signals having a corresponding one of a plurality of wavelengths;
an optical power monitoring circuit configured to generate a plurality of sense signals, each of which being indicative of a corresponding one of a plurality of power levels, each of the plurality of power levels being associated with a corresponding one of the plurality of optical signals; and
a processor circuit that:
identifies the plurality of power levels, a lowest power level being one of the plurality of power levels that is less than remaining ones of the plurality of power levels;
determines a plurality of target attenuations, each of which corresponding to a difference between a corresponding one of the plurality of power levels and the lowest power level, each of the plurality of target attenuations corresponding to a respective one of the plurality of optical signals;
determines a plurality of attenuation errors, each of which corresponding to a difference between a corresponding one of the plurality of target attenuations and a respective one of a plurality of cumulative attenuations, each of the plurality of cumulative attenuations corresponding to an amount a corresponding one of the plurality of optical signals has been attenuated over a period of time, each of the plurality of attenuation errors corresponding to a respective one of the plurality of optical signals; and outputs a plurality of control signals, the optical circuit attenuating selected ones of the plurality of optical signals in response to the control signals, such that each of the plurality of power levels is substantially equal to one another after said attenuating, the selected ones of the plurality of optical signals being associated with a sub-group of the plurality of attenuation errors, each attenuation error in the sub-group of the plurality of attenuation errors having a value greater than 0 dB.

13. An apparatus in accordance with claim 12, wherein the sub-group of the plurality of attenuation errors is a first sub-group of the plurality of attenuation errors, each of remaining ones of the plurality of optical signals, other than the selected ones of the plurality of optical signals, corresponding to a respective one of a second sub-group of the plurality of attenuation errors, each attenuation error in the second sub-group of the plurality of attenuation errors having a value equal to or less than 0 dB, each of the remaining ones of the plurality of optical signals being substantially unattenuated by the optical circuit.

14. An apparatus in accordance with claim 12, wherein the apparatus further includes an optical amplifier having an amplification stage, which supplies the plurality of optical signals to the optical circuit.

15. An apparatus in accordance with claim 14, wherein the amplification stage is a first stage of the optical amplifier, the optical amplifier having a second stage, that receives the plurality of optical signal from the optical circuit.

16. An apparatus in accordance with claim 12, wherein the optical circuit includes a dynamic gain equalizer (DGE) circuit.

17. An apparatus in accordance with claim 16, wherein the DGE includes a plurality of optical attenuators.

18. An apparatus in accordance with claim 12, wherein said optical circuit successively attenuates said selected ones of the plurality of optical signals over a plurality of iterations.

19. An apparatus in accordance with claim 18, wherein an amount of attenuation associated with a first one of the plurality of iterations is different than an amount of attenuation associated with a second one of the plurality of iterations.

20. An apparatus in accordance with claim 12, wherein the plurality of attenuation errors is a first plurality of attenuation errors, and the plurality of wavelengths being a first plurality of wavelengths, a second plurality of wavelengths being associated with an absence of the plurality of optical signals, the processor circuit further:

determines a second plurality of attenuation errors, each of which corresponding to a respective one of the second plurality of wavelengths, the plurality of control signals being generated based, at least in part, on the first and second pluralities of attenuation errors.

21. An apparatus in accordance with claim 20, wherein the optical circuit includes a plurality of variable optical attenuators, a number of the plurality of optical attenuators being different than a sum of the pluralities of first and second wavelengths, the processor circuit:
generates the plurality of control signals based on the first and second pluralities of attenuation errors, the number of the plurality of optical attenuators, and the sum of the pluralities of first and second wavelengths, and supplies each of the plurality of control signals to a corresponding one of the plurality of variable optical attenuators, such that each of the plurality of variable optical attenuators has a corresponding one of a plurality of attenuations, the plurality of optical signals being attenuated in accordance with the plurality of attenuations.

22. An apparatus in accordance with claim 12, wherein the apparatus includes an optical amplifier, each of the plurality of optical signals is supplied to the optical amplifier from a fiber span, the fiber span having an associated span loss, the optical circuit being provided in the optical amplifier, the optical amplifier being configured to amplify the optical signals, provided that the span loss is between a maximum and minimum span loss, the method further including the steps of:

subtracting the span loss from the maximum span loss to obtain a loss amount; and allocating loss associated with the optical circuit to the loss amount, when the loss amount is less than a predetermined value.

* * * * *